(12) United States Patent
Guo et al.

(10) Patent No.: US 11,460,755 B2
(45) Date of Patent: Oct. 4, 2022

(54) HAND-HELD GIMBAL AND HAND-HELD GIMBAL APPARATUS

(71) Applicant: SZ DJI TECHNOLOGY CO., LTD., Shenzhen (CN)

(72) Inventors: Shengjia Guo, Shenzhen (CN); Dexi Li, Shenzhen (CN); Yin Tang, Shenzhen (CN); Guisheng Nong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 7 days.

(21) Appl. No.: 17/090,202

(22) Filed: Nov. 5, 2020

(65) Prior Publication Data

US 2021/0055635 A1 Feb. 25, 2021

Related U.S. Application Data

(63) Continuation of application No. PCT/CN2018/093845, filed on Jun. 29, 2018.

(51) Int. Cl.
| | |
|---|---|
| *F16M 11/00* | (2006.01) |
| *G03B 17/56* | (2021.01) |
| *F16M 11/12* | (2006.01) |
| *F16M 11/18* | (2006.01) |
| *F16M 13/04* | (2006.01) |

(52) U.S. Cl.
CPC ......... *G03B 17/561* (2013.01); *F16M 11/123* (2013.01); *F16M 11/18* (2013.01); *F16M 13/04* (2013.01)

(58) Field of Classification Search
CPC .... G03B 17/561; G03B 19/00; F16M 11/123; F16M 11/18; F16M 11/2071; H04N 5/2251
See application file for complete search history.

(56) References Cited

U.S. PATENT DOCUMENTS

| | | |
|---|---|---|
| 8,704,944 B1 | 4/2014 | Wierzoch et al. |
| 2016/0381271 A1 | 12/2016 | Cheng et al. |
| 2017/0064176 A1 | 3/2017 | Kim |
| 2019/0208101 A1* | 7/2019 | Gohl ................... H04N 5/23261 |
| 2019/0215457 A1* | 7/2019 | Enke ................... H04N 5/23258 |
| 2019/0219224 A1 | 7/2019 | Kang et al. |

(Continued)

FOREIGN PATENT DOCUMENTS

| | | |
|---|---|---|
| CN | 201429762 Y | 3/2010 |
| CN | 204420520 U | 6/2015 |

(Continued)

OTHER PUBLICATIONS

The World Intellectual Property Organization (WIPO) International Search Report for PCT/CN2018/093845 dated Dec. 19, 2018 8 Pages (including translation).

(Continued)

*Primary Examiner* — Amy J. Sterling
(74) *Attorney, Agent, or Firm* — Anova Law Group, PLLC

(57) ABSTRACT

A hand-held gimbal includes a handle portion and a gimbal photographing device mounted on the handle portion. A display screen is disposed at the handle portion and configured to display at least one of content captured by the gimbal photographing device or a photographing parameter of the gimbal photographing device.

19 Claims, 7 Drawing Sheets

(56) References Cited

U.S. PATENT DOCUMENTS

2021/0240059 A1\* 8/2021 Ma .................. G03B 17/561
2021/0247667 A1\* 8/2021 Chu .................. F16M 11/121

FOREIGN PATENT DOCUMENTS

| | | |
|---|---|---|
| CN | 105744027 A | 7/2016 |
| CN | 205524979 U | 8/2016 |
| CN | 205606108 U | 9/2016 |
| CN | 106030923 A | 10/2016 |
| CN | 205864552 U | 1/2017 |
| CN | 107071598 A | 8/2017 |
| CN | 107466379 A | 12/2017 |
| CN | 206797763 U | 12/2017 |
| CN | 207112256 U | 3/2018 |
| CN | 207200802 U | 4/2018 |
| CN | 108204494 A | 6/2018 |
| CN | 207471091 U | 6/2018 |
| EP | 3736483 A1 | 11/2020 |
| WO | 2015101822 A1 | 7/2015 |
| WO | 2017213339 A1 | 12/2017 |

OTHER PUBLICATIONS

Product: Removu K1 4K UHD Video Camera with Integrated 3-Axis Self Stabilizer, first available on Sep. 22, 2017 https://www.amazon.com/removu-camera-integrated-3-axis-stabilizer/dp/b075vk1mk3.
Removu K1—Self-Stabilizing 4K Camera, Quick Start Guide V 1.0 https://images-na.ssl-images-amazon.com/images/I/A11gZu3BPWS.pdf.

\* cited by examiner

HAND-HELD GIMBAL AND HAND-HELD GIMBAL APPARATUS

CROSS-REFERENCE TO RELATED APPLICATION

This application is a continuation of International Application No. PCT/CN2018/093845, filed on Jun. 29, 2018, the entire content of which is incorporated herein by reference.

TECHNICAL FIELD

The present disclosure relates to the field of gimbals, and in particular relates to a hand-held gimbal and a hand-held gimbal apparatus.

BACKGROUND

With development of gimbal technology, users have increasing demands for the use of gimbal. For example, establishing a connection between a gimbal and a terminal (mainly referring to a mobile terminal), so that the images obtained by the gimbal can be viewed in real-time or the images obtained by the gimbal can be stored in real-time. Currently, most commonly a cable is drawn from the inside of the gimbal, and then the cable is connected to the terminal. However, the establishment of the connection between the gimbal and the terminal can be cumbersome to achieve.

SUMMARY

According to one aspect of the present disclosure, there is provided a hand-held gimbal. The hand-held gimbal includes a handle portion, and a gimbal photographing device mounted on the handle portion. A display screen is disposed at the handle portion and configured to display at least one of content captured by the gimbal photographing device or a photographing parameter of the gimbal photographing device.

According to another aspect of the present disclosure, there is provided a hand-held gimbal. The hand-held gimbal includes a handle portion and a gimbal photographing device mounted on the handle portion. An adaptor configured to be coupled to a mobile device is disposed at the handle portion. The adaptor protrudes from a side of the handle portion to connect to the mobile device. After the adaptor is connected to the mobile device, and the hand-held gimbal is docked to the adapter and is supported at an end of the mobile device.

BRIEF DESCRIPTION OF THE DRAWINGS

In order to more clearly explain the technical solutions in the embodiments of the present disclosure, the following will briefly introduce the drawings required in the description of the embodiments. Obviously, the drawings in the following description are only some of the embodiments of the present disclosure, and for those of ordinary skill in the art, other drawings may be obtained based on these drawings without creative labor.

DETAILED DESCRIPTION OF THE EMBODIMENTS

The technical solutions in the embodiments of the present disclosure will be described clearly and completely in conjunction with the drawings in the embodiments of the present disclosure. Obviously, the described embodiments are only some of the embodiments but not all of the embodiments of the present disclosure. Based on the embodiments of the present disclosure, all other embodiments obtained by those of ordinary skill in the art without making creative efforts fall within the scope of the disclosure.

The hand-held gimbal and the hand-held gimbal apparatus of the present disclosure will be described in detail below with reference to the drawings. When no conflict exists, the features in the following examples and implementations can be combined with each other.

Figure 1:
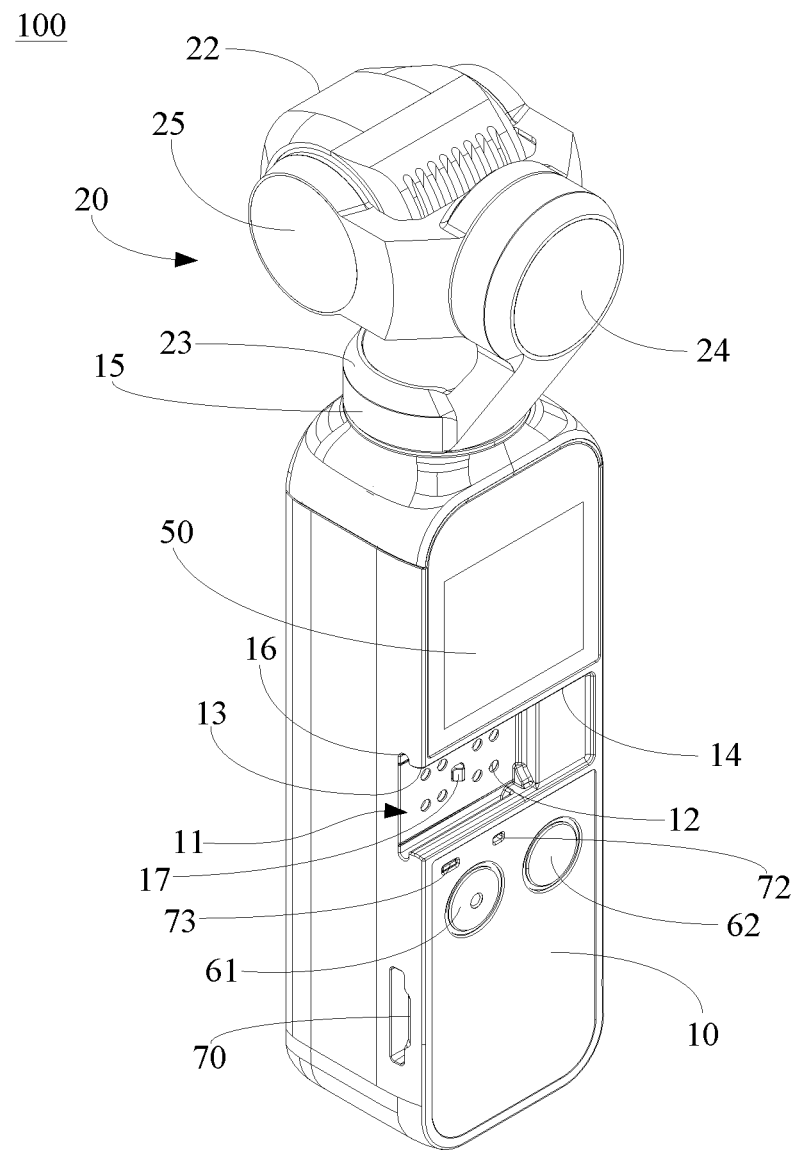
FIG. 1 is a schematic perspective diagram of a hand-held gimbal according to an embodiment of the present disclosure.
Figure 2:
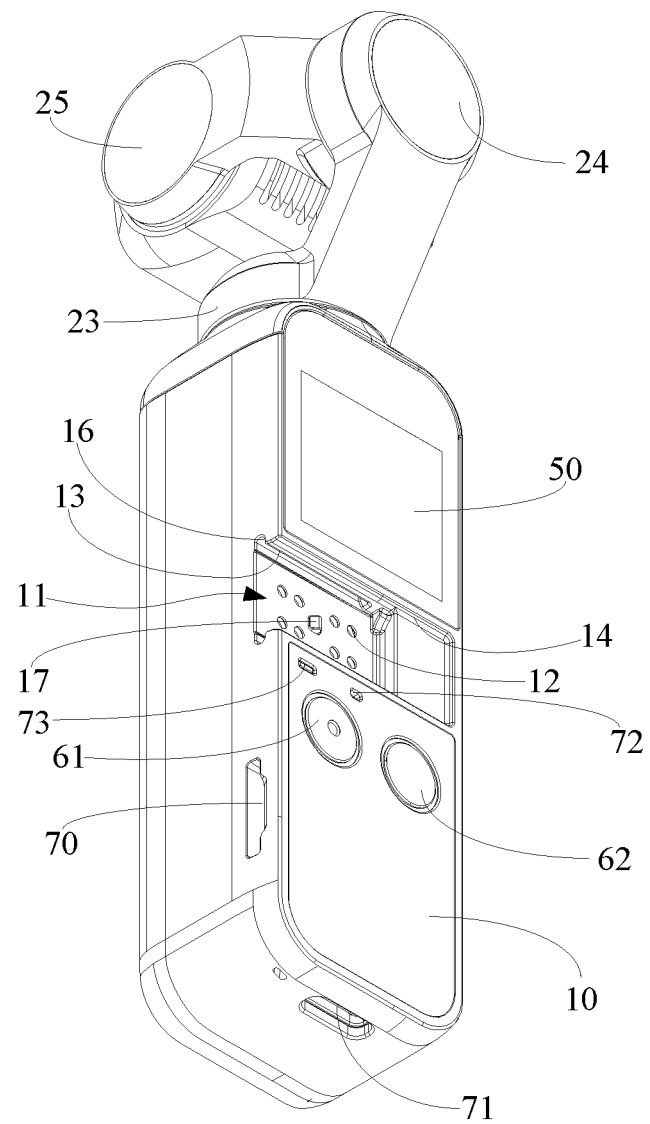
FIG. 2 is a schematic perspective diagram of the hand-held gimbal from another perspective according to another embodiment of the present disclosure.
Figure 3:
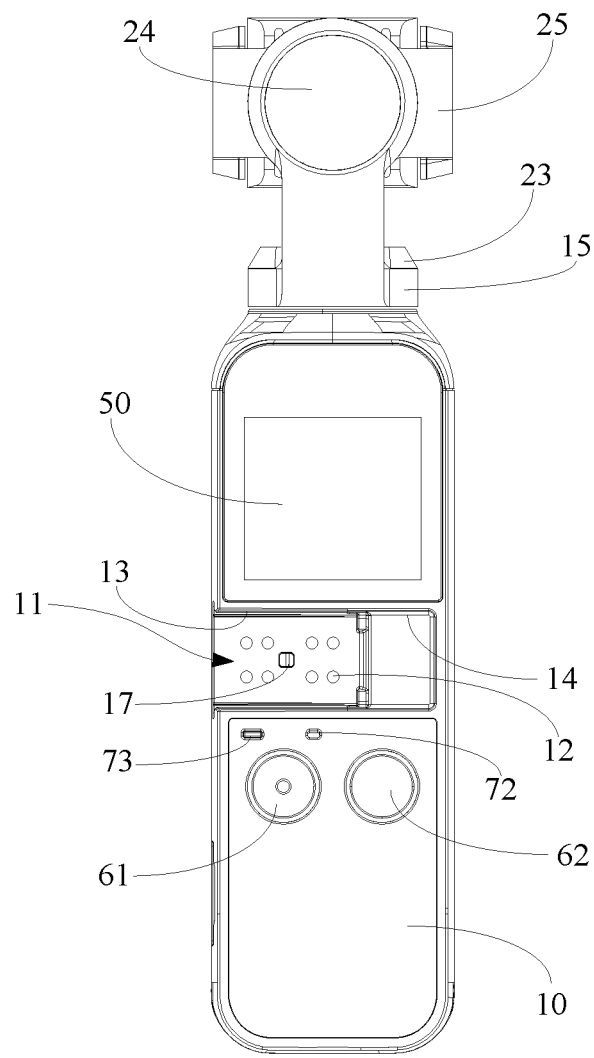
FIG. 3 is a schematic structural diagram of the hand-held gimbal according to an embodiment of the present disclosure.

As shown in FIGS. 1 to 3, an embodiment of the present disclosure may provide a hand-held gimbal 100, including: a handle portion 10 and a gimbal photographing device 20 mounted on the handle portion 10. The handle portion 10 may be provided with a display screen 50 configured to display content captured by the gimbal photographing device, photographing parameter of the gimbal photographing device, or both the captured content and the photographing parameter. In this embodiment, the display screen 50 may employ a touchable liquid crystal display (LCD). Of course, in other examples, other types of display screens can also be employed.

By setting the display screen 50 on the handle portion 10 of the hand-held gimbal 100, the display screen can display the captured content or related parameters of the gimbal photographing device 20, so that the user can quickly browse pictures and videos captured by the gimbal photographing device 20 or parameters on the display screen 50, which improves interaction between the hand-held gimbal 100 and the user and its fun, and meets the diversified needs of the user.

In an optional embodiment, the handle portion 10 may be further provided with a control portion 60 configured to control the gimbal photographing device 20. By operating the control portion 60, an operation of the gimbal photographing device 20, for example, on/off operation of the gimbal photographing device 20, photographing of the gimbal photographing device 20, etc., may be controlled, so that the user can quickly operate the gimbal photographing device 20. The control part 60 may be a key (virtual key or physical key), or a knob. In this embodiment, the control unit 60 include a shutter button 61 configured to control the gimbal photographing device 20 in photographing and a power button 62 configured to control an on/off operation of the gimbal photographing device 20. Of course, the control unit 60 may also include other control buttons, such as an image storage button, an image playback control button, etc., which can be set according to actual needs.

Further, the control portion 60 and the display screen 50 may be provided on a same side of the handle portion 10, and the control portion 60. The display screen 50 shown in the figure may be provided on a front of the handle portion 10, which is more in line with the user's usage habits and operation convenience, so that the appearance and layout of the entire hand-held gimbal 100 can be more reasonable and aesthetically pleasing.

In an optional embodiment, the handle portion 10 may be further provided with a card slot 70 configured to receive a storage element. In this embodiment, the card slot 70 may be disposed on the side of the handle portion 10 adjacent to the display screen 50, and an SanDisk (SD) card may be plugged into the card slot 70 to store the image captured by the gimbal photographing device 20 in the SD card. Moreover, the card slot 70 may be disposed on the side, which may not affect the use of other functions, and the user experience can be relatively good.

In an optional embodiment, a power supply battery configured to supply power to the handle portion 10 and the gimbal photographing device 20 may be disposed inside the handle portion 10. The power supply battery may employ an accumulator. The accumulator can have a large capacity and a small volume to realize a miniaturized design of the hand-held gimbal 100.

Further, the handle portion 10 may be further provided with a charging interface 71. In this embodiment, the charging interface 71 may be disposed at a bottom of the handle portion 10, which is more convenient for connecting with an external power source, so as to charge the power supply battery.

In an optional embodiment, the handle portion 10 may be further provided with a microphone 72 configured to collect an audio signal and an indicator light 73 configured to display a battery status. The indicator light 73 may be single or plural. In this embodiment, there is one indicator light 73. The user can implement audio interaction with the display screen 50 through the microphone 72, which further improves the interaction between the hand-held gimbal 100 and the user and its fun, and meets the diversified needs of the user. In addition, the indicator light 73 can achieve a reminder effect, and the user can obtain a power status of the hand-held gimbal 100 through the indicator light 73, to charge the hand-held gimbal 100 in time. In addition, both the microphone 72 and the indicator light 73 can also be provided on the front of the handle portion 10, which is more in line with the user's usage habits and convenient operation, and can make the appearance and layout of the entire hand-held gimbal 100 more reasonable and aesthetically pleasing.

In an optional embodiment, the gimbal photographing device 20 may include a gimbal frame connected to the handle portion 10 and a photographing device 22 mounted on the gimbal frame. The photographing device 22 may be a camera, or an imaging component composed of a lens and an image sensor (e.g., (complementary metal-oxide semiconductor (CMOS), or charge-coupled device (CCD)), which can be selected according to specific needs. In this embodiment, the gimbal frame may be a three-axis gimbal frame. The three-axis gimbal frame may include a translation axis assembly 23 movably connected to the handle portion 10, a roll axis assembly 24 movably connected to the translation axis assembly 23, and a pitch axis assembly 25 movably connected to the roll axis assembly 24. The photographing device 22 may be mounted on the pitch axis assembly 25. Of course, in other examples, the gimbal frame may also be a two-axis gimbal, a four-axis gimbal, etc., which can be selected according to specific needs. As in the figure, when the hand-held gimbal 100 is in an initial state, the gimbal photographing device 20 may face a first direction (that is, a direction toward the paper), and the display screen 50 may face a second direction (that is, a direction away from the paper), and the second direction is opposite to the first direction. This makes it easier for the user to view content displayed on the display screen 50 at a better angle while taking pictures through the gimbal photographing device 20. Of course, in practical applications, a photographing angle of the gimbal photographing device 20 can be adjusted by the three-axis gimbal frame. The above-mentioned initial state is that the hand-held gimbal 100 reaches a stable equilibrium state after being powered on, and in this initial state, if the user holds the handle portion 10 and does not move, then the camera 20 of the gimbal and the handle portion 10 may also maintain a relatively static state, and the state at this time can be interpreted as the initial state of the hand-held gimbal 100, or a zero state. In this state, the gimbal photographing device 20 and the display screen 50 may be exactly in the directions away from each other. Generally, the display screen 50 may face the user, and the gimbal photographing device 20 may face away from the user, so that the content captured by the gimbal photographing device 20 or the photographing parameter of the gimbal photographing device can be displayed on the display screen 50, and the user can view them directly on the display screen 50.

Further, the display screen 50 can also be a touch screen, which can also be used as an input interface for user instructions. The user's operations such as touching, pressing, and sliding on the display screen 50 can correspond to rotation of the gimbal photographing device 20 of the hand-held gimbal 100 in various directions or setting of various functions during photographing action and photographing process.

Further, the top of the handle portion 10 may be provided with a connection portion 15 configured to connect with the gimbal frame. The translation axis assembly 23 of the gimbal frame may be detachably connected to the connection portion 15, so as to replace the gimbal photographing device 20 of different models and sizes according to different needs of users.

As shown in FIGS. 1 to 5, an embodiment of the present disclosure may further provide a hand-held gimbal 100 including a handle portion 10 and a gimbal photographing device 20 mounted on the handle portion 10, and the handle portion 10 may be provided with an adaptor 30 configured to be coupled to a mobile device 90 (e.g., a mobile phone). A portion of the adaptor 30 may protrude from the side of the handle portion configured to be connected to a mobile device 90. When the adaptor 30 is connected to the mobile device 90, the hand-held gimbal 100 may be docked to the adaptor 30 and supported at the end of the mobile device 90.

The adaptor 30 configured to be connected to the mobile device 90 may be provided at the handle portion 10, and then the handle portion 10 and the mobile device 90 may be connected to each other. The handle portion 10 can be used as a base of the mobile device 90. The user may hold the other end of the mobile device 90 to pick up the handheld gimbal 100, the connection can be convenient and quick, and the product can be aesthetically pleasing. In addition, after the handle portion 10 is coupled to the mobile device 90 through the adaptor 30, the connection between the hand-held gimbal 100 and the mobile device 90 can be achieved, and data can be transmitted between the gimbal photographing device 20 and the mobile device 90. The layout can be reasonable and easy to use.

In an optional embodiment, a length of the handle portion 10 may be smaller than a length or a width of the mobile device 90, to achieve a compact appearance. As such, when the hand-held gimbal 100 is connected to the mobile device 90 through the adaptor 30, the handle portion 10 may be supported at the end of the mobile device 90 as a base of the mobile device 90. The user can also pick up the gimbal 100 by holding the other end of the mobile device 90, which may be convenient and quick to connect, and may have an aesthetic appearance.

In an optional embodiment, the adaptor 30 may be detachably connected to the handle portion 10; that is, the adaptor 30 and the handle portion 10 can be mechanically connected or removed. Further, referring to FIG. 4, the adaptor 30 may be provided with an electrical contact portion 31, and the handle portion 10 may be provided with an electrical contact fitting portion 12 that engages with the electrical contact portion 31.

Accordingly, when the hand-held gimbal 100 need not be connected to the mobile device 90, the adaptor 30 can be removed from the handle portion 10. When the handheld gimbal 100 needs to be connected to the mobile device 90, the adaptor 30 may be mounted on the handle portion 10 to complete a mechanical connection between the adaptor 30 and the handle portion 10. At the same time through the connection between an electrical contact portion 31 and an electrical contact fitting portion 12, the data transmission between the gimbal photographing device 20 and the mobile device 90 can be achieved through the adaptor 30.

In this embodiment, the side portion of the handle portion 10 may be provided with a receiving slot 11, and the adaptor 30 may slide to engage with the receiving slot 11. After the adaptor 30 is installed in the receiving slot 11, a portion of the adaptor 30 may protrude from the receiving slot 11, and the portion of the adaptor 30 protruding from the receiving slot 11 may be configured to be connected to the mobile device 90.

Figure 5:
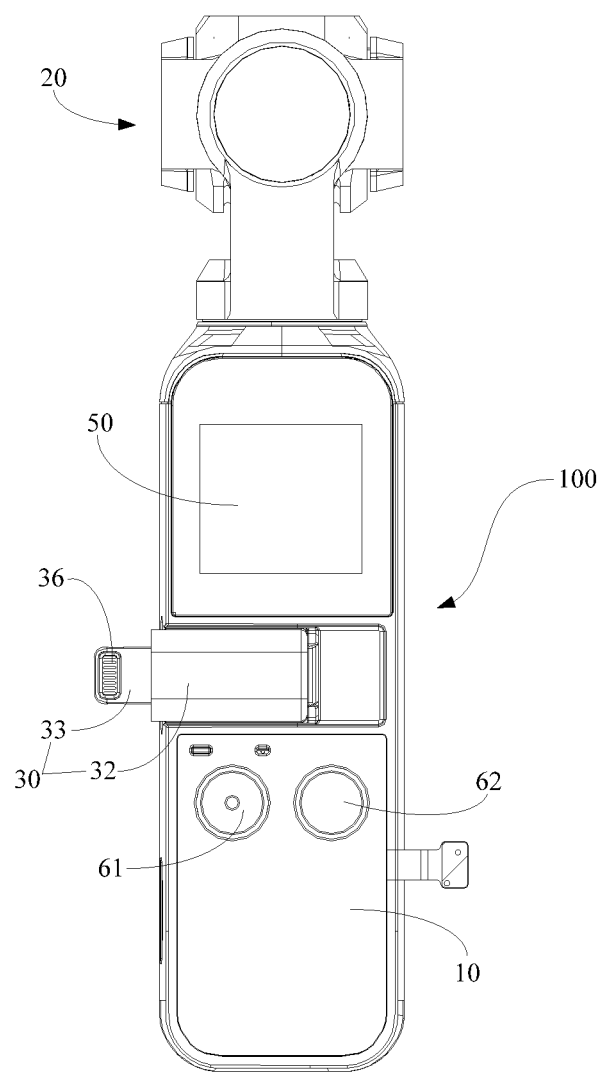
Figure 6:
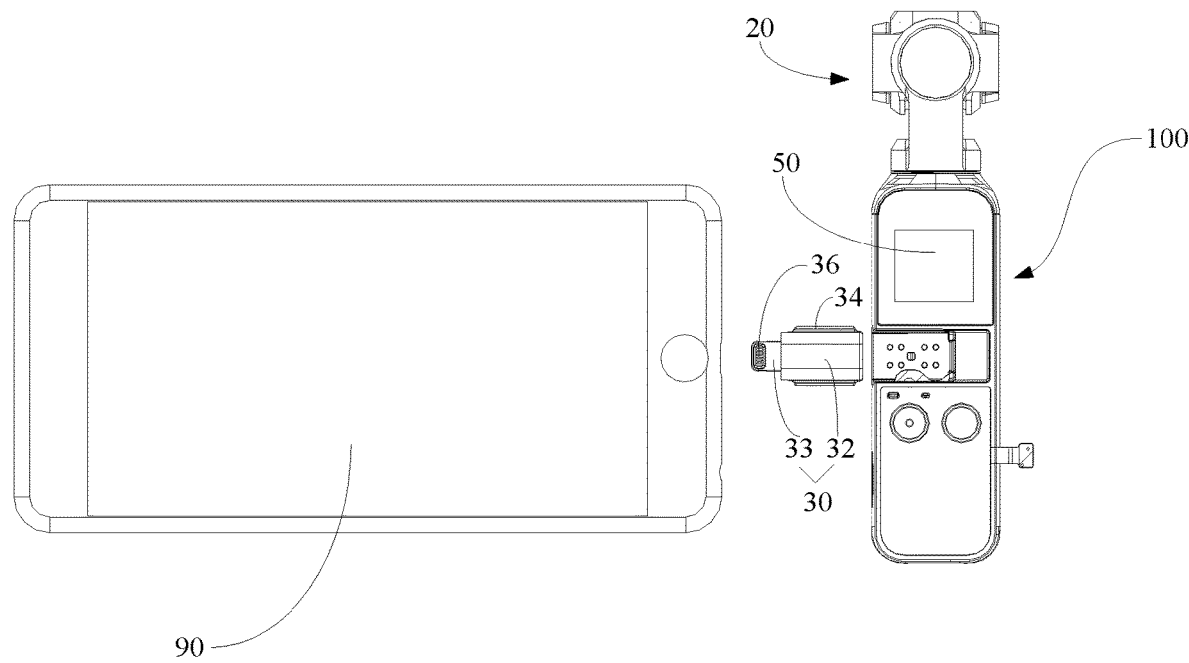
FIGS. 6 and 7 are schematic diagrams illustrating a connection between the hand-held gimbal and the mobile device according to an embodiment of the present disclosure.
Figure 7:
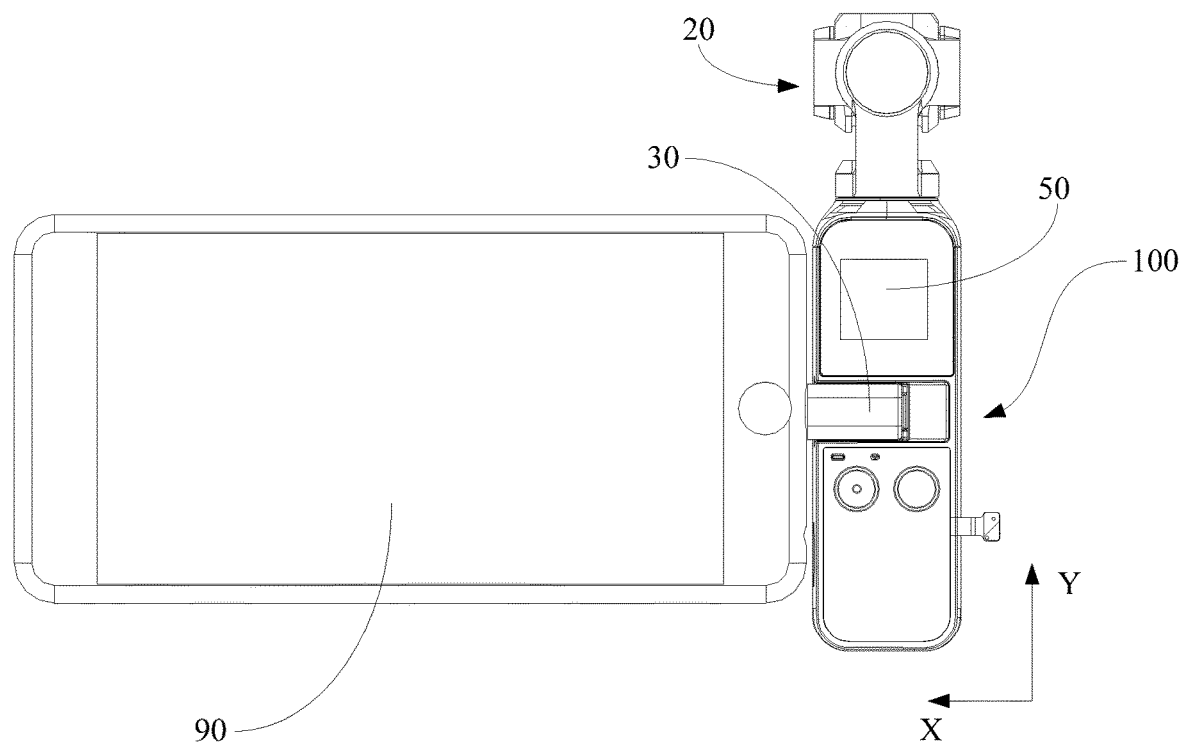

With reference to FIGS. 5 and 6, in an optional embodiment, the adaptor 30 may include a body 32 and an adaptor head 33 disposed at the body 32. An electrical connection 36 configured to be electrically connected to the mobile device 90 may be provided at an end of the adaptor head 33. When the adaptor 30 is plugged into the receiving slot 11 from the body 32 (i.e., the body 32 of the adaptor 30 is plugged into the receiving slot 11 first), the adaptor head 33 may protrude from the receiving slot 11 and be configured to be connected to the mobile device 90. Referring to FIG. 7, after the mobile device 90 is connected to the adaptor head 33 of the adaptor 30, the adaptor head 33 may be plugged into the mobile device 90 to achieve a mechanical connection between the adaptor 30 and the mobile device 90. The electrical connection between the adaptor 30 and the mobile device 90 may be achieved by a connection between the electrical connection portion 36 and the internal electrical contact portion of the mobile device 90.

Figure 8:
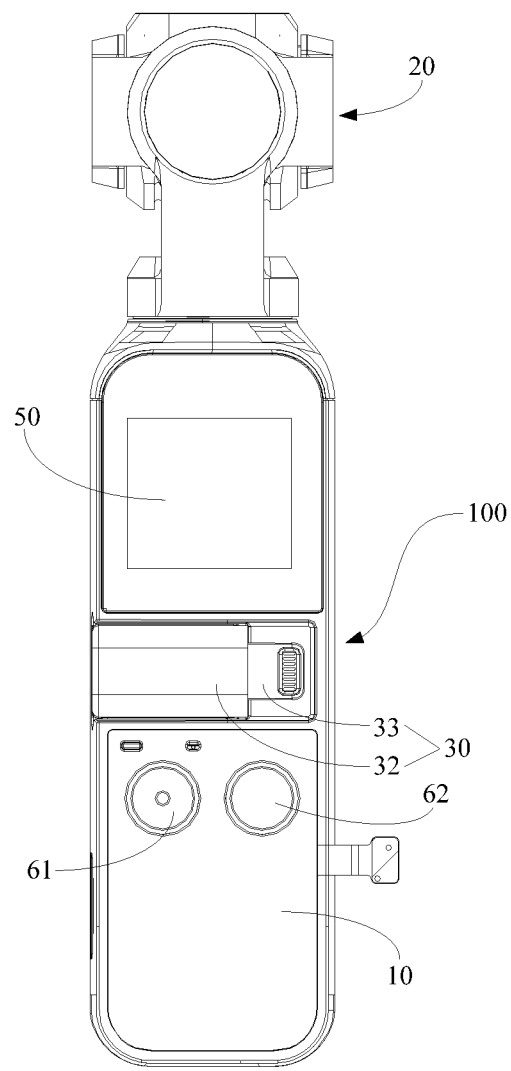
FIG. 8 is a schematic structural diagram of the hand-held gimbal according to another embodiment of the present disclosure.

Further, referring to FIG. 8, when the adaptor 30 is plugged into the receiving slot 11 from the adaptor head 33 (i.e. the adaptor head 33 is plugged into the receiving slot 11 first), the body 32 may be aligned with the receiving slot 11, to receive the adaptor 30 in the receiving slot 11 of the handle portion 10.

Therefore, when the hand-held gimbal 100 needs to be connected to the mobile device 90, the adaptor 30 can be plugged into the receiving slot 11 from the body 32, so that the adaptor head 33 can protrude from the receiving slot 11 and the mobile device 90 and the handle portion 10 can be connected to each other, as shown in FIG. 7. After the mobile device 90 is used, or when the mobile device 90 needs to be unplugged, the adaptor 30 can be removed from the receiving slot of the handle portion 10 and then be plugged into the receiving slot 11 from the adaptor head 33 in a reverse direction, to receive the adaptor 30 in the handle portion 10. The adaptor 30 may be aligned with the receiving slot 11 of the handle portion 10, which does not affect the appearance and structure of the handle portion 10, and it can be easier to carry the adaptor 30 when it is received in the handle portion 10.

In an optional embodiment, the receiving slot 11 may include a first receiving portion 13 and a second receiving portion 14. The first receiving portion 13 may be located outside the second receiving portion 14, and the second receiving portion 14 may be adapted to the adaptor head 33 of the adaptor 30.

When the adaptor 30 is plugged into the receiving slot 11 from the body 32, the body 32 may be located in the first receiving portion 13 and abut a side of the second receiving portion 14. The adaptor head 33 may protrude from the first receiving portion 13, which facilitates the connection of the mobile device 90.

When the adaptor 30 is plugged into the receiving slot 11 from the adaptor head 33, the body 32 may be located in the first receiving portion 13 and abut the side of the second receiving portion 14. The adaptor head 33 may be located in the second receiving portion 14 to receive the adaptor 30 in the receiving slot 11 of the handle portion 10.

Optionally, a depth of the first receiving portion 13 may engage with a thickness of the body 32, to ensure that when the adaptor 30 is plugged into the receiving slot 11, a surface of the adaptor 30 may be aligned with a surface of the handle portion 10. Accordingly, when the adaptor 30 is received in the handle portion 10, the surface of the handle portion 10 can be ensured to be flat.

In the example shown in the figure, the receiving slot 11 may be semi-openly disposed on one the side of the handle portion 10, which makes it easier for the adaptor 30 to slide to be engaged with the receiving slot 11. Of course, in other examples, the adaptor 30 can also be detachably connected to the receiving slot 11 of the handle portion 10 by snap connection, plugging, etc. When the adaptor 30 is detachably connected to the receiving slot 11 of the handle portion 10 by snap connection or plugging, the receiving slot 11 can also be disposed in the middle of the side of the handle part 10, so that a structure of the entire receiving slot 11 can be hidden inside the handle portion 10, which makes the appearance of the handle portion 10 more tidy.

In an optional embodiment, the side wall of the first receiving portion 13 may be provided with a guide groove 16 formed inwardly, and the side portion of the body 32 of the adaptor 30 may be provided with a guide portion 34 to which the guide groove 16 fits. Through the engagement between the guide portion 34 and the guide groove 16, the adaptor 30 can slide into the receiving slot 11 to play a guiding role. In addition, the guide groove 16 may be recessed inwardly from the side wall of the first receiving portion 13. After the adaptor 30 engages with the receiving slot 11, the guiding groove 16 can also limit the guide portion 34 along the depth direction of the receiving slot 11 to move, to further restrict the adaptor 30.

Figure 4:
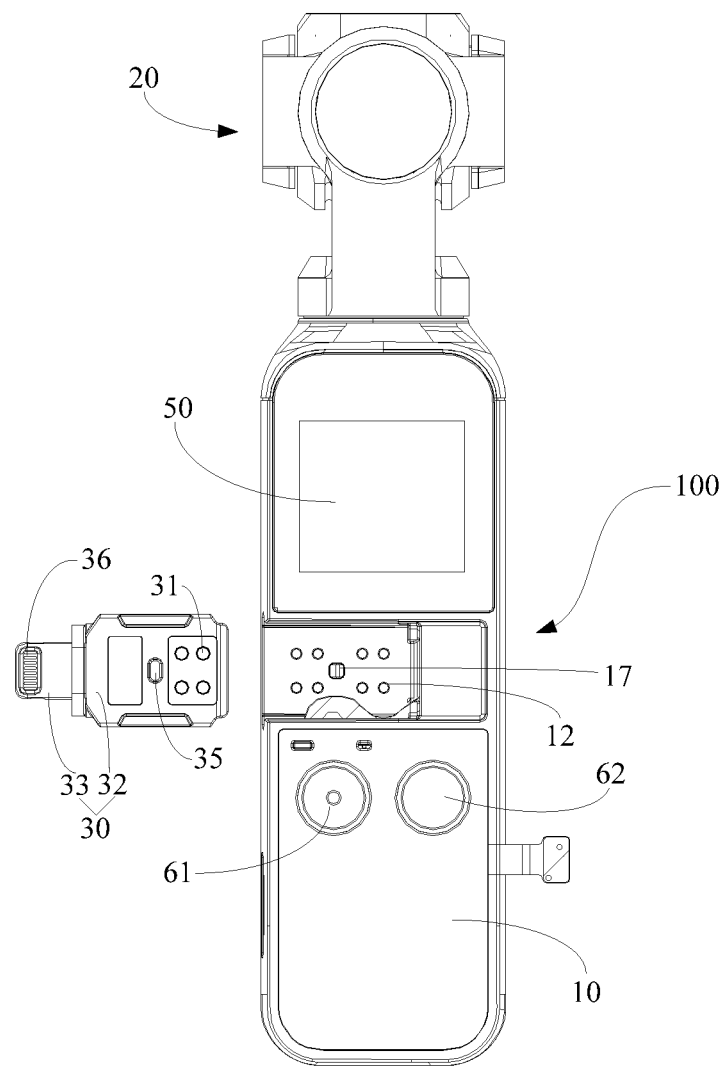
FIGS. 4 and 5 are schematic structural diagrams of the hand-held gimbal and a mobile device according to another embodiment of the present disclosure.

Further, referring to FIGS. 2 and 4, any of the receiving slot 11 and the adaptor 30 may be provided with a positioning pin 17, and the other one of the receiving slot 11 and the adaptor 30 may be provided with a positioning groove 35 that engages with the positioning pin 17. In this embodiment, a bottom of the body 32 of the adaptor 30 may be provided with the positioning groove 35. The positioning pin 17 may be an elastic member that can expand and contract in the depth direction of the receiving slot 11. The bottom of the first receiving portion 13 of the receiving slot 11 may be provided with a receiving space, and the positioning pin 17 may be disposed in the receiving space. The end of the positioning pin 17 may be a tapered structure with a slope or a spherical structure and protrude from a bottom surface of first receiving portion 13.

Accordingly, during the engagement between the adaptor 30 and the receiving slot 11, and when the adaptor 30 contacts the positioning pin 17, the protruding portion of the positioning pin 17 from the bottom surface of the first receiving portion 13 may be squeezed to retract into the receiving space. After the adaptor 30 moves into a corresponding place, a position of the positioning groove 35 may correspond to a position of the positioning pin 17. At this time, the positioning pin 17 may extend to re-protrude from the bottom surface of the first receiving portion 13 and engage with the positioning groove 35, so that the adaptor 30 can be limited to move along a length direction of the receiving slot 11, to further restrict the adaptor 30.

With reference to FIGS. 2 and 4, in an optional embodiment, the electrical contact portion 31 may be disposed at a bottom of the body 32 of the adaptor 30, and the bottom of the first receiving portion of the receiving slot 11 may be provided with the electrical contact fitting portion 12 that engages with the electrical contact portion 31.

In this embodiment, the electrical contact portion 31 and the electrical contact fitting portion 12 may be electrically connected by means of point contact. For example, the electrical contact portion 31 may be selected as a retractable probe, an electrical socket, or an electrical contact point. Of course, in other examples, the electrical connection between the electrical contact portion 31 and the electrical contact fitting portion 12 may also be directly implemented by surface-to-surface contact.

In an optional embodiment, the handle portion 10 may be provided with a display screen 50, and the display screen 50 may be configured to display the content captured by the gimbal photographing device 20, the photographing parameter of the gimbal photographing device, or both the captured content and the photographing parameter. In this embodiment, the display screen 50 may employ a touchable LCD. Of course, in other examples, other types of display screens can also be employed.

By disposing the display screen 50 on the handle portion 10 of the hand-held gimbal 100, the display screen can display the content captured by the gimbal photographing device 20 or the photographing parameter of the gimbal photographing device, so that the user can quickly browse the pictures and videos captured by the gimbal photographing device or the parameters on the display screen 50, which improves the interaction between hand-held gimbal 100 and the user and its fun, and meets the diversified needs of the user.

In an optional embodiment, the handle portion 10 may be further provided with a control portion 60 configured to control the gimbal photographing device 20. By operating the control portion 60, the operation of the gimbal photographing device 20, for example, on/off operation of the gimbal photographing device 20, photographing of the gimbal photographing device 20, etc., can be controlled, so that the user can quickly operate the gimbal photographing device 20. The control portion 60 may be a button (virtual button or physical button), or a knob. In this embodiment, the control unit 60 may include a shutter button 61 configured to control the photographing of the gimbal photographing device and a power button 62 configured to control the on/off operation of gimbal photographing device 20. Of course, the control unit 60 may also include other control buttons, such as an image storage button, an image playback control button, etc., which can be set according to actual needs.

Further, the control portion 60 and the display screen 50 may be disposed on the same side of the handle portion 10, and the control portion 60 and the display screen 50 shown in the figure may be disposed at the front of the handle portion 10, which is more in line with user's usage habits and operation convenience, and the appearance and layout of the entire hand-held gimbal 100 can be more reasonable and aesthetically pleasing.

In an optional embodiment, the handle portion 10 may be further provided with a card slot 70 configured to receive a storage element. In this embodiment, the card slot 70 may be disposed on the side of the handle portion 10 adjacent to the display screen 50, and an SD card may be plugged into the card slot 70 to store the image captured by the gimbal photographing device 20 in the SD card. Moreover, the card slot 70 may be disposed at the side, which may not affect the use of other functions, and the user experience can be relatively good.

In an optional embodiment, a power supply battery configured to supply power to the handle portion 10 and the gimbal photographing device 20 may be disposed inside the handle portion 10. The power supply battery may employ an accumulator. The accumulator may have a large capacity and a small volume to realize a miniaturized design of the hand-held gimbal 100.

Further, the handle portion 10 may be further provided with a charging interface 71. In this embodiment, the charging interface 71 may be disposed at the bottom of the handle portion 10, which is more convenient for connecting with an external power source, to charge the power supply battery.

In an optional embodiment, the handle portion 10 may be further provided with a microphone 72 configured to collect an audio signal and an indicator light 73 configured to display the power. The indicator light 73 may be single or plural. In this embodiment, there may be one indicator light 73. The user can implement audio interaction with the display screen 50 through the microphone 72, which further improves the interaction between the hand-held gimbal 100 and the user and the fun, and meets the diversified needs of the user. In addition, the indicator light 73 can achieve a reminder effect, and the user can obtain the power status of the hand-held gimbal 100 through the indicator light 73 in order to charge the hand-held gimbal 100 in time. In addition, both the microphone 72 and the indicator light 73 can also be disposed at the front of the handle portion 10, which is more in line with the user's usage habits and convenient operation, and can make the appearance and layout of the entire hand-held gimbal 100 more reasonable and aesthetically pleasing.

In an optional embodiment, the gimbal photographing device 20 may include a gimbal frame connected to the handle portion 10 and the photographing device 22 mounted on the gimbal frame. The photographing device 22 may be a camera, or an imaging component composed of a lens and an image sensor (e.g., CMOS or CCD), which can be selected according to specific needs. In this embodiment, the gimbal frame may be a three-axis gimbal frame. The three-axis gimbal frame may include the translation axis assembly 23 movably connected to the handle portion 10, the roll axis assembly 24 movably connected to the translation axis assembly 23, and pitch axis assembly 25 movably connected to the roll axis assembly 24. The photographing device 22 may be mounted on the pitch axis assembly 25. Of course, in other examples, the gimbal frame may also be a two-axis gimbal, a four-axis gimbal, etc., which can be selected according to specific needs. As in the figure, when the hand-held gimbal 100 may be in the initial state, the gimbal photographing device 20 may face the first direction (that is, the direction toward the paper), and the display screen 50 may face the second direction (that is, the direction away from the paper). The second direction may be opposite to the first direction. This can make it easier for the user to view the content displayed on the display screen 50 at a better angle while taking pictures through the gimbal photographing device 20. Of course, in practical applications, the photographing angle of the gimbal photographing device 20 can be adjusted by the three-axis gimbal frame. The above-mentioned initial state is that the hand-held gimbal 100 reaches a stable equilibrium state after being powered on, and in this initial state, if the user holds the handle portion 10 and does not move, then the photographing device 20 of the gimbal and the handle portion 10 may maintain a relatively static state to each other, and the state at this time can be interpreted as the initial state of the hand-held gimbal 100, or the zero state. Under this state, the gimbal photographing device 20 and the display screen 50 may be exactly in the directions away from each other, and generally, the display screen 50 may face the user, and the gimbal photographing device 20 may face away from the user, so that the content captured by the gimbal photographing device 20 or the photographing parameter of the gimbal photographing device can be displayed on the display screen 50, and the user can view them directly on the display screen 50.

Furthermore, the display screen 50 can also be a touch screen, which can also be configured to be an input interface for user instructions. The user's operations such as touching, pressing, and sliding on the display screen 50 may correspond to rotation of the gimbal photographing device 20 of the hand-held gimbal 100 in various directions or setting of various functions during the photographing action and photographing process.

Further, the top of the handle portion 10 may be provided with a connection portion 15 configured to connect with the gimbal frame. The translation axis assembly 23 of the gimbal frame may be detachably connected to the connection portion 15, so as to replace the gimbal photographing device 20 of different models and sizes according to different needs of users.

As shown in FIG. 1 to FIG. 7, an embodiment of the present disclosure may further provide a hand-held gimbal 100 device including a handle portion 10, a gimbal photographing device 20 mounted on the handle portion 10, and a mobile device 90 connected to the handle portion 10. The handle portion 10 may be provided with an adaptor 30 plugged into the mobile device 90, and the adaptor 30 may be connected between the mobile device 90 and the handle portion 10 so that the mobile device 90 may form/become a cantilever structure that protrudes from the handle portion 10.

The adaptor 30 configured to be plugged into the mobile device 90 may be disposed at the handle portion 10, and then the handle portion 10 and the mobile device 90 may be connected to each other, so that the mobile device 90 can form a cantilever structure that protrudes from the handle portion 10, Therefore, the data transmission can be achieved between the gimbal photographing device 20 and the mobile device 90, and the layout can be reasonable and convenient for use. The user can pick up the hand-held gimbal 100 together by holding the other end of the mobile device 90, which can be convenient and quick to connect, and may have an aesthetic appearance. The handle portion 10 can also be used as a base of the mobile device 90. In addition, after the handle portion 10 is coupled to the mobile device 90 through the adaptor 30, the connection between the hand-held gimbal 100 and the mobile device 90 can be achieved. The data transmission between 20 and mobile device 90 may be possible, and the layout can be reasonable and convenient for use.

In an optional embodiment, the length of the handle portion 10 may be smaller than the length and width of the mobile device 90, so as to achieve a compact appearance. Accordingly, when the hand-held gimbal 100 is connected to the mobile device 90 through the adaptor 30, the handle portion 10 can be supported at the end of the mobile device 90, as a base of the mobile device 90. The user can also pick up the hand-held gimbal 100 by holding the other end of the mobile device 90, which can be convenient and quick to connect, and may have an aesthetic appearance.

In an optional embodiment, the adaptor 30 may be detachably connected to the handle portion 10; that is, the adaptor 30 and the handle portion 10 can be mechanically connected or removed. Further, referring to FIG. 4, the adaptor 30 may be provided with an electrical contact portion 31, and the handle portion 10 may be provided with an electrical contact fitting portion 12 that engages with the electrical contact portion 31.

Accordingly, when the handheld gimbal 100 need not be connected to the mobile device 90, the adaptor 30 can be removed from the handle portion 10. When the handheld gimbal 100 needs to be connected to the mobile device 90, the adaptor 30 may be connected to the handle portion 10 to complete a mechanical connection between the adaptor 30 and the handle portion 10, and at the same time the electrical connection between the electrical contact portion and the electrical contact fitting portion 12 can be ensured by the connection of the two, so as to realize the data transmission between the gimbal photographing device 20 and the mobile device 90 through the adaptor 30.

In this embodiment, a side portion of the handle portion 10 may be provided with a receiving slot 11, and the adaptor 30 can slide to engage with the receiving slot 11. After the adaptor 30 is received in the receiving slot 11, a portion of the adaptor 30 may protrude from the receiving slot 11, and a portion of the adaptor 30 protruding from the receiving slot 11 may be configured to be connected to the mobile device 90.

With reference to FIGS. 5 and 6, in an optional embodiment, the adaptor 30 may include a body 32 and an adaptor head 33 provided on the body 32. An electrical connection portion 36 configured to be connected to the mobile device 90 may be provided at an end of the adaptor head 33. When the adaptor 30 is plugged into the receiving slot 11 from the body 32, the adaptor head 33 may protrude from the receiving slot 11 and be configured to be connected to the mobile device 90. Referring to FIG. 7, after the mobile device 90 is connected to the adaptor head 33 of the adaptor 30, the adaptor head 33 may be plugged into the mobile device 90 to achieve a mechanical connection between the adaptor 30 and the mobile device 90. The electrical connection between the adaptor 30 and the mobile device 90 can be achieved by the connection between the electrical connection portion 36 and the internal electrical contact structure of the mobile device 90.

Further, referring to FIG. 8, when the adaptor 30 is inserted into the receiving slot 11 from the adaptor head 33, the body 32 may be aligned with the receiving slot 11, and then the adaptor 30 may be received in the receiving slot 11 of the handle portion 10.

Therefore, when the hand-held gimbal 100 needs to be connected to the mobile device 90, the adaptor 30 can be plugged into the receiving slot 11 from the body 32 so that the adaptor head 33 can protrude from the receiving slot 11, and the mobile device 90 and the handle part 10 can be connected to each other, as shown in FIG. 7. After the mobile device 90 is used, or when the mobile device 90 needs to be unplugged, the adaptor 30 can be removed from the handle portion 10 of the receiving slot 11 and then may be plugged into the receiving slot 11 from the adaptor head 33 in a reverse direction, to further receive the adaptor 30 in the handle portion 10. The adaptor 30 may be aligned with the receiving slot 11 of the handle 10, which does not affect the appearance and structure of the handle portion 10, and makes it easier to carry the adaptor 30 when it is received the handle portion 10.

In an optional embodiment, the receiving slot 11 may include a first receiving portion 13 and a second receiving portion 14. The first receiving portion 13 may be located outside the second receiving portion 14, and the second receiving portion 14 may be adapted to the adaptor head 33 of the adaptor 30.

When the adaptor 30 is plugged into the receiving slot 11 from the body 32, the body 32 may be located in the first receiving portion 13 and abut the second receiving portion 14. The adaptor head 33 may protrude from the first receiving portion 13, which facilitates the connection with the mobile device 90.

When the adaptor 30 is plugged into the receiving slot 11 from the adaptor head 33, the body 32 may be located in the first receiving portion 13 and abut the second receiving portion 14. The adaptor head 33 may be located in the second receiving portion 14, to further receive the adaptor 30 in the receiving slot 11 of the handle portion 10.

Optionally, a depth of the first receiving portion 13 may engage with a thickness of the body 32 to ensure that after the adaptor 30 engages with the receiving slot 11, a surface of the adaptor 30 can be in line with a surface of the handle portion. Accordingly, when the adaptor 30 is received in the handle portion 10, the surface of the handle portion 10 can be ensured to be flat.

In the example shown in the figure, the receiving slot 11 may be semi-openly disposed on a side surface of the handle portion 10, so that the adaptor 30 can slide to engage with the receiving slot 11. Of course, in other examples, the adaptor 30 can also be detachably connected to the receiving slot 11 of the handle portion 10 by snap connection, plugging, etc. When the adaptor 30 is detachably connected to the receiving slot 11 of the handle portion 10 by snap connection or plugging, the receiving slot 11 can also be disposed at the middle of the side of the handle portion 10, so that the internal structure of the entire receiving slot 11 can be hidden inside the handle portion 10, which cab make the appearance of the handle part 10 more neat.

In an optional embodiment, a side wall of the first receiving portion 13 may be provided with a guide groove 16 formed inwardly, and the side portion of the body 32 of the adaptor 30 may be provided with a guide portion 34 to which the guide groove 16 fits. Through the engagement between the guide portion 34 and the guide groove 16, the adaptor 30 can slide into the receiving slot 11 to play a guiding role. In addition, the guide groove 16 may be recessed inwardly from the side wall of the first receiving portion 13. After the adaptor 30 engages with the receiving slot 11, the guiding groove 16 can also limit the guide portion 34 to move along the depth direction of the receiving slot 11 to further restrict the adaptor 30.

Further, referring to FIGS. 2 and 4, any one of the receiving slot 11 and the adaptor 30 may be provided with a positioning pin 17, and other one of the receiving slot 11 and the adaptor 30 may be provided with a positioning groove 35 that engages with the positioning pin 17. In this embodiment, a bottom of the body 32 of the adaptor 30 may be provided with a positioning groove 35. The positioning pin 17 may be an elastic member that can expand and contract in the depth direction of the receiving slot 11. The bottom of the first receiving portion 13 of the receiving slot 11 can be provided with a receiving space, and the positioning pin 17 may be disposed in the receiving space. An end of the positioning pin 17 may be a tapered structure with a slope or a spherical structure that protrudes from a bottom surface of the first receiving portion 13.

Accordingly, during the engagement between the adaptor 30 and the receiving slot 11, when the adaptor 30 contacts the positioning pin 17, the protruding portion of the positioning pin 17 from the bottom surface of the first receiving portion 13 may be squeezed to retract into the receiving space. After the adaptor 30 moves into place, a position of the positioning groove 35 may correspond to a position of the positioning pin 17. At this time, the positioning pin 17 may extend to re-protrude from the bottom surface of the first receiving portion 13 and engage with the positioning groove 35, to limit the adaptor 30 to move along the length direction of the receiving slot 11, so as to further restrict the adaptor 30.

With reference to FIGS. 2 and 4, in an optional embodiment, the bottom of the body 32 of the adaptor 30 may be provided with an electrical contact portion 31, and the bottom of the first receiving portion 13 of the receiving slot 11 may be provided with an electrical contact fitting portion 12 that engages with the electrical contact portion 31.

In this embodiment, the electrical contact portion 31 and the electrical contact fitting portion 12 may be electrically connected by means of point contact. For example, the electrical contact portion 31 may be selected as a retractable probe, an electrical socket, or an electrical contact point. Of course, in other examples, the electrical connection between the electrical contact portion 31 and the electrical contact fitting portion 12 may also be directly implemented by surface-to-surface contact.

In an optional embodiment, the handle portion 10 may be provided with a display screen 50 configured to display content captured by the gimbal photographing device 20, or a photographing parameter of the gimbal photographing device, or both the captured content and the photographing parameter. In this embodiment, the display screen 50 may employ a touchable LCD. Of course, in other examples, other types of display screens can also be employed.

By disposing a display screen 50 on the handle portion 10 of the hand-held gimbal 100, the display screen can display the captured content by the gimbal photographing device 20 or the related parameters, so that the user can quickly browse the pictures, video captured by the gimbal photographing device 20 or parameters on the display screen 50, so as to improve the interaction between the hand-held gimbal 100 and the user and the fun, and meet the diversified needs of the user.

In an optional embodiment, the handle portion 10 may be further provided with a control portion 60 configured to control the gimbal photographing device 20. By operating the control portion 60, the operation of the gimbal photographing device 20, for example, on/off operation of the gimbal photographing device 20, photographing of the gimbal photographing device 20, etc., can be controlled, so that the user can quickly operate the gimbal photographing device 20. The control portion 60 may be a button (virtual button or physical button), or a knob. In this embodiment, the control portion 60 may include a shutter button 61 configured to control the gimbal photographing device 20 to take images and a power button 62 configured to control the on/off operation of the gimbal photographing device 20. Of course, the control portion 60 may also include other control buttons, such as an image storage button, an image playback control button, etc., which can be set according to actual needs.

Further, the control portion 60 and the display screen 50 may be disposed on the same side of the handle portion 10, and the control portion 60 and the display screen 50 shown in the figure may be disposed at the front of the handle part 10, which is more in line with the user's usage habits and operation convenience, and the appearance and layout of the entire handheld gimbal 100 can be more reasonable and aesthetically pleasing.

In an optional embodiment, the handle portion 10 may be further provided with a card slot 70 configured to receive a storage element. In this embodiment, the card slot 70 may be disposed on the side of the handle portion 10 adjacent to the display screen 50, and an SD card may be plugged into the card slot 70 to store the image captured by the gimbal photographing device 20 in the SD card. Moreover, the card slot 70 may be disposed at the side, which does not affect the use of other functions, and the user experience can be relatively good.

In an option embodiment, a power supply battery configured to supply power to the handle portion 10 and the gimbal photographing device 20 may be disposed inside the handle portion 10. The power supply battery may employ an accumulator. The accumulator may have a large capacity and a small volume to achieve a miniaturized design of the handheld gimbal 100.

Further, the handle portion 10 may be further provided with a charging interface 71. In this embodiment, the charging interface 71 may be disposed at the bottom of the handle portion 10, which is more convenient for connecting with an external power source, so as to charge the power supply battery.

In an optional embodiment, the handle portion 10 may be further provided with a microphone 72 configured to collect an audio signal and an indicator light 73 configured to display the power. The indicator light 73 may be single or plural. In this embodiment, there is one indicator light 73. The user can implement audio interaction with the display screen 50 through the microphone 72, which may further improve the interaction between the hand-held gimbal 100 and the user and the fun, and may meet the diversified needs of the user. In addition, the indicator light 73 can achieve a reminder effect, and the user can obtain a power status of the hand-held gimbal 100 through the indicator light 73 in order to charge the hand-held gimbal 100 in time. In addition, both the microphone 72 and the indicator light 73 can also be disposed at the front of the handle part 10, which can be more in line with the user's usage habits and convenient operation, and can make the appearance and layout of the entire handheld gimbal 100 more reasonable and aesthetically pleasing.

In an optional embodiment, the gimbal photographing device 20 may include a gimbal frame connected to the handle portion 10 and a photographing device 22 mounted on the gimbal frame. The photographing device 22 may be a camera, or an imaging component composed of a lens and an image sensor (e.g., CMOS, or CCD), which can be selected according to specific needs. In this embodiment, the gimbal frame may be a three-axis gimbal frame. The three-axis gimbal frame may include a translation axis assembly 23 movably connected to the handle portion 10, a roll axis assembly 24 movably connected to the translation axis assembly 23, and a pitch axis assembly 25 movably connected to the roll axis assembly 24. The photographing device 22 may be mounted on the pitch axis assembly 25. Of course, in other examples, the gimbal frame may also be a two-axis gimbal, a four-axis gimbal, etc., which can be selected according to specific needs. As in the figure, when the hand-held gimbal 100 is in the initial state, the gimbal photographing device 20 may face a first direction (that is, a direction toward the paper), and the display screen 50 may face a second direction (that is, a direction away from the paper). The second direction may be opposite to the first direction, which makes it easier for the user to view the content displayed on the display screen 50 at a better angle while taking pictures through the gimbal photographing device 20. Of course, in practical applications, the photographing angle of the gimbal photographing device 20 can be adjusted by the three-axis gimbal frame. The above-mentioned initial state is that the hand-held gimbal 100 reaches a stable equilibrium state after being powered on, and in this initial state, if the user holds the handle portion 10 and does not move, then the gimbal photographing device 20 and the handle portion 10 can maintain a relatively static state to each other, and the state at this time can be interpreted as the initial state of the hand-held gimbal 100, or a zero state. Under this state, the gimbal photographing device 20 and the display screen 50 may be exactly in directions away from each other. Generally, the display screen 50 may face the user, and the gimbal photographing device 20 may face away from the user, so that the content captured by the gimbal photographing device 20 or the photographing parameter of the gimbal photographing device can be displayed on the display screen 50, and the user can view them directly on the display screen 50.

Furthermore, the display screen 50 can also be a touch screen, which can also be used as an input interface for user instructions. The user's operations such as touching, pressing, and sliding on the display screen 50 can correspond to rotation of the gimbal photographing device 20 of the hand-held gimbal 100 in various directions or setting of various functions during photographing action and photographing process.

Further, the top of the handle portion 10 may be provided with a connection portion 15 configured to connect with the gimbal frame. The translation axis assembly 23 of the gimbal support may be detachably connected to the connection portion 15, so as to replace the gimbal photographing device 20 of different models and sizes according to different needs of users.

With reference to FIG. 7, in an optional embodiment, a surface of the mobile device 90 may be disposed in parallel with a surface of the handle portion 10. Preferably, the surface of the mobile device 90 may be disposed in line with (e.g. on a same plane as) the surface of the handle portion 10, and a bottom end of the mobile device 90 may be disposed in parallel with a side surface of the handle portion 10. That is, the surface of the mobile device 90 may be in line with the surface of the display screen 50 of the handle portion 10, which may be convenient for the user to view both the mobile device 90 and the display screen 50.

Further, when the mobile device 90 is connected to the handle portion 10 through the adaptor 30, a bottom surface of the mobile device 90 may be in contact with the side surface of the handle portion 10 to ensure a stable connection between the two.

The display screen 50 and the control section 60 may be both disposed on the first surface of the handle section 10 (the front of the handle section 10 shown in the figure), and the surface of the mobile device 90 and the surface of the handle portion 10 may be disposed in parallel. A card slot 70 may be disposed on the second surface of the handle portion 10 (the side surface of the handle portion 10 shown in the figure), and the bottom surface of the mobile device 90 may be disposed in contact with the second surface of the handle portion 10 such that the layout of the handle portion 10 can be more reasonable and convenient for use.

With reference to FIG. 7, in an optional embodiment, the adaptor 30 may be rotatably connected to the handle portion 10. The adaptor 30 can rotate relative to the handle portion 10 along a length direction of the handle portion 10 (Y direction shown in FIG. 7). The adaptor 30 may also rotate relative to the handle portion 10 in a width direction of the handle portion 10 (X direction shown in FIG. 7). Therefore, there may be a certain angle between the surface of the mobile device 90 and the surface of the handle portion 10 (which can be understood as the surface of the display screen 50), which can satisfy the usage habits of different users.

It should be noted that in this specification, relational terms such as "first" and "second" are used only to distinguish one entity or operation from another entity or operation, and do not necessarily require or imply an actual relationship or order between these entities or operations. The terms "include", or any other variations are intended to cover non-exclusive inclusion, so that a process, method, article, or device that includes a series of elements includes not only those elements, but also other items not explicitly listed elements, or also include elements inherent to such process, method, article, or device. Without more restrictions, the element defined by the sentence "include one . . ." does not exclude that there are other identical elements in the process, method, article or device that includes the element.

The above describes the gimbal handle provided by the embodiments of the present disclosure and the gimbal having the same. Specific examples are used in this specification to explain the principles and implementation of the present disclosure, in order to help understand the method of the present disclosure and its core idea. At the same time, for those of ordinary skill in the art, according to the idea of the present disclosure, changes may occur in the specific implementation and scope of application. In summary, this content of this specification should not be construed as limiting the disclosure.

What is claimed is:

1. A hand-held gimbal, comprising:
   a handle portion; and
   a gimbal photographing device mounted on the handle portion, wherein:
   an adaptor configured to be coupled to a mobile device is disposed at the handle portion; the adaptor protrudes from a side of the handle portion to connect to the mobile device; and
   after the adaptor is connected to the mobile device, and the hand-held gimbal is docked to the adaptor and is supported at an end of the mobile device.

2. The hand-held gimbal according to claim 1, wherein the adaptor is detachably connected to the handle portion.

3. The hand-held gimbal according to claim 2, wherein: a receiving slot is disposed at the side of the handle portion, the adaptor slides to engage with the receiving slot, and a portion of the adaptor protrudes from the receiving slot.

4. The hand-held gimbal according to claim 3, wherein:
   the adaptor includes a body and an adaptor head disposed on the body;
      when the adaptor is plugged into the receiving slot from the body, the adaptor head protrudes from the receiving slot; and/or when the adaptor is plugged into the receiving slot from the adaptor head, the body is aligned with the receiving slot.

5. The hand-held gimbal according to claim 3, wherein a positioning pin is disposed at one of the receiving slot and the adaptor, and a positioning groove that engages with the positioning pin is disposed at the other one of the receiving slot and the adaptor.

6. The hand-held gimbal according to claim 1, wherein a length of the handle portion is smaller than at least one of a length or a width of the mobile device.

7. The hand-held gimbal according to claim 3, wherein: a display screen configured to display at least one of content captured by the gimbal photographing device or a photographing parameter is disposed at the handle portion.

8. The hand-held gimbal according to claim 1, wherein a control portion configured to control the gimbal photographing device is disposed at the handle portion.

9. The hand-held gimbal according to claim 8, wherein the control portion includes a shutter button configured to control photographing of the gimbal photographing device and a power button configured to control on/off operation of the gimbal photographing device.

10. The hand-held gimbal according to claim 1, wherein a charging interface is further disposed at the handle portion.

11. The hand-held gimbal according to claim 10, wherein the charging interface is disposed at a bottom of the handle portion.

12. The hand-held gimbal according to claim 1, wherein a microphone configured to collect an audio signal is further disposed at the handle portion.

13. The hand-held gimbal according to claim 1, wherein an indicator light configured to display a battery status is further disposed at the handle portion.

14. The hand-held gimbal according to claim 1, wherein the gimbal photographing device includes a gimbal frame connected to the handle portion and a photographing device mounted on the gimbal frame.

15. The hand-held gimbal according to claim 14, wherein the gimbal frame is a three-axis gimbal frame.

16. The hand-held gimbal according to claim 7, wherein a control portion configured to control the gimbal photographing device and the display screen are disposed on a same side of the handle portion.

17. The hand-held gimbal according to claim 7, wherein a card slot configured to receive a storage element is further disposed at the handle portion.

18. The hand-held gimbal according to claim 17, wherein the card slot is disposed on a side of the handle portion adjacent to the display screen.

19. The hand-held gimbal according to claim 14, wherein a connection portion configured to connect with the gimbal frame is disposed at a top of the handle portion.

* * * * *